United States Patent
Knoop et al.

(10) Patent No.: US 10,927,906 B2
(45) Date of Patent: Feb. 23, 2021

(54) DISC BRAKE

(71) Applicant: Meritor Heavy Vehicle Braking Systems (UK) Limited, Gwent (GB)

(72) Inventors: Dietmar Knoop, Gwent (GB); Neel Shah, Gwent (GB); Sean Cleary, Gwent (GB); Dave Hubbard, Gwent (GB)

(73) Assignee: Meritor Heavy Vehicle Braking Systems (UK) Limited, Cwmbran (GB)

(*) Notice: Subject to any disclaimer, the term of this patent is extended or adjusted under 35 U.S.C. 154(b) by 87 days.

(21) Appl. No.: 15/995,358

(22) Filed: Jun. 1, 2018

(65) Prior Publication Data

US 2018/0347649 A1   Dec. 6, 2018

(30) Foreign Application Priority Data

Jun. 2, 2017   (GB) .................................... 1708863

(51) Int. Cl.
| | |
|---|---|
| *F16D 55/2255* | (2006.01) |
| *F16D 65/097* | (2006.01) |
| *F16D 65/02* | (2006.01) |
| *F16D 55/00* | (2006.01) |

(52) U.S. Cl.
CPC ..... *F16D 55/2255* (2013.01); *F16D 65/0976* (2013.01); *F16D 65/0978* (2013.01); *F16D 65/0974* (2013.01); *F16D 2055/0041* (2013.01); *F16D 2065/026* (2013.01); *F16D 2250/0084* (2013.01)

(58) Field of Classification Search
CPC ............. F16D 55/2255; F16D 65/0976; F16D 65/0978; F16D 2055/0041; F16D 2250/0084; F16D 65/0974; F16D 2065/026

See application file for complete search history.

(56) References Cited

U.S. PATENT DOCUMENTS

| | | | |
|---|---|---|---|
| 2,973,837 A | 3/1961 | Wilson | |
| 3,285,371 A * | 11/1966 | Cadiou | ................ F16D 65/095 188/73.32 |
| 3,357,523 A | 12/1967 | Reed et al. | |
| 3,677,373 A | 7/1972 | Lucien | |

(Continued)

FOREIGN PATENT DOCUMENTS

| | | |
|---|---|---|
| DE | 2038649 A1 | 2/1971 |
| DE | 1952568 A1 | 5/1971 |

(Continued)

OTHER PUBLICATIONS

European Patent Office, Extended European Search Report for related Application No. 18175492.0-1012 , dated Oct. 16, 2018.

(Continued)

*Primary Examiner* — Xuan Lan Nguyen
(74) *Attorney, Agent, or Firm* — Brooks Kushman PC

(57) ABSTRACT

A brake pad, a disc brake, and a method of fitting a brake pad. At least one of a first brake pad and a second brake pad and corresponding support structures may have complementary profiles on circumferential faces thereof arranged so as to permit the brake pad to be inserted into a corresponding support structure in a transverse direction of the brake pad and at an angle to a circumferential direction of the support structure.

17 Claims, 8 Drawing Sheets

(56) References Cited

U.S. PATENT DOCUMENTS

| | | | |
|---|---|---|---|
| 4,364,455 A | 12/1982 | Oshima | |
| 4,609,077 A | 9/1986 | Nakatsuhara | |
| 4,685,543 A | 8/1987 | Ziolkowski | |
| 7,849,977 B2 | 12/2010 | Gruber et al. | |
| 8,540,061 B1 | 9/2013 | Plantan et al. | |
| 9,285,002 B2 * | 3/2016 | Iraschko | F16D 55/226 |
| 2005/0194222 A1 | 9/2005 | Stickney et al. | |
| 2006/0175162 A1 | 8/2006 | Thorp | |
| 2007/0114102 A1 | 5/2007 | Iraschko | |
| 2007/0137952 A1 | 6/2007 | Cortinovis et al. | |
| 2007/0261927 A1 | 11/2007 | Iraschko et al. | |
| 2009/0026028 A1 | 1/2009 | Gasslbauer | |
| 2009/0159376 A1 | 6/2009 | Rossignol et al. | |
| 2010/0236876 A1 | 9/2010 | Sarica et al. | |
| 2011/0198170 A1 | 8/2011 | Turani et al. | |
| 2012/0160616 A1 | 6/2012 | Passalacqua et al. | |
| 2013/0277159 A1 | 10/2013 | Borgmeier et al. | |
| 2013/0277160 A1 | 10/2013 | Dreher et al. | |
| 2014/0047690 A1 | 2/2014 | Plantan et al. | |
| 2014/0131148 A1 | 5/2014 | Plantan et al. | |
| 2014/0367208 A1 | 12/2014 | Miyake et al. | |
| 2016/0195147 A1 | 7/2016 | Carney | |
| 2016/0250676 A1 | 9/2016 | Borgmeier et al. | |
| 2018/0106313 A1 | 4/2018 | Fricke et al. | |
| 2019/0078631 A1 * | 3/2019 | Knoop | B60T 1/065 |

FOREIGN PATENT DOCUMENTS

| | | |
|---|---|---|
| DE | 19706123 A1 | 12/1981 |
| DE | 4224914 A1 | 2/1993 |
| DE | 102007020884 A1 | 11/2008 |
| DE | 102010019470 A1 | 11/2011 |
| DE | 102013101781 A1 | 5/2014 |
| DE | 102016001321 A | 8/2017 |
| EP | 0730107 A2 | 9/1996 |
| EP | 1717476 A1 | 11/2006 |
| EP | 2199640 A1 | 6/2010 |
| EP | 2644926 A1 | 10/2013 |
| EP | 2831445 A1 | 2/2015 |
| FR | 2680214 A1 | 2/1993 |
| FR | 2771147 A1 | 5/1999 |
| FR | 2775742 A1 | 9/1999 |
| GB | 1045941 A | 10/1966 |
| GB | 1275440 A | 5/1972 |
| GB | 2434624 A | 8/2007 |
| JP | S56160437 A | 12/1981 |
| JP | S61109928 A | 5/1986 |
| JP | 2002039238 A | 2/2002 |
| JP | 2006090392 A | 4/2006 |
| JP | 2006153139 A | 6/2006 |
| JP | 2015031295 A | 2/2015 |
| WO | 2004074705 A1 | 9/2004 |
| WO | 2004094857 A1 | 11/2004 |
| WO | 2014028454 A1 | 2/2014 |

OTHER PUBLICATIONS

European Patent Office, Search Report for related Application No. GB1708863.4, dated Jul. 21, 2017.

The State Intellectual Property Office of the People's Republic of China, Office Action for corresponding Chinese application No. 201810552763.5, dated Jul. 3, 2019.

Intellectual Property Office of India, Office Action dated Mar. 23, 2020, for corresponding Application No. 201814020617; 6 Pages.

* cited by examiner

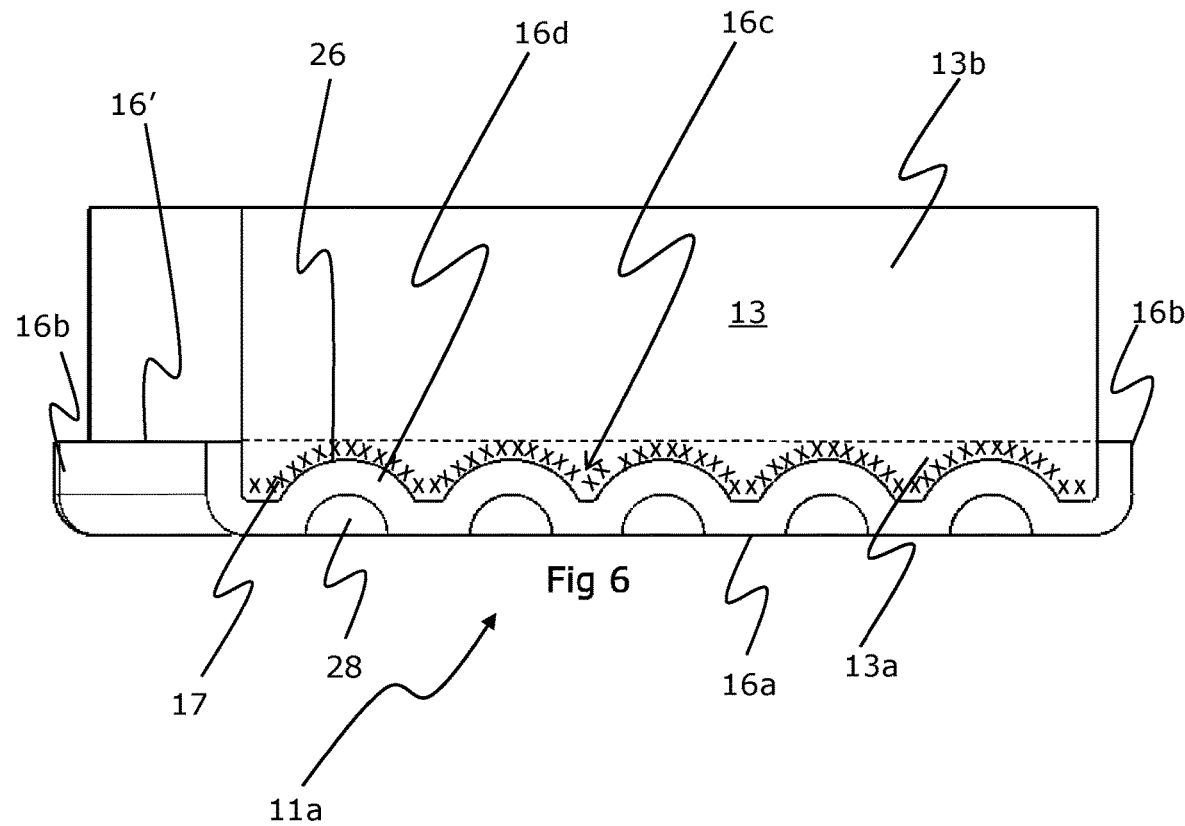
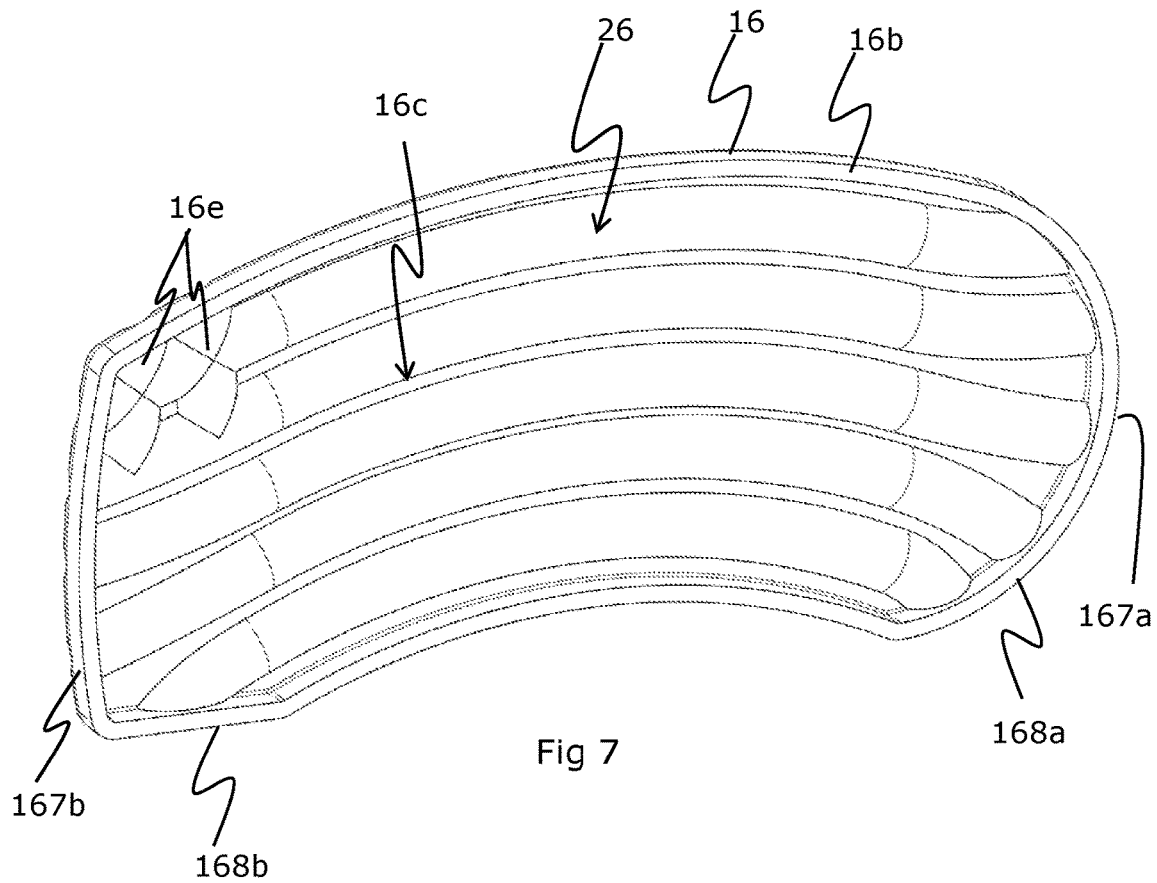

DISC BRAKE

TECHNICAL FIELD

The present invention relates to a disc brake. More particularly, but not exclusively, the present invention relates to an arrangement for the fitting and retention of brake pads of a disc brake.

BACKGROUND

Braking systems of heavy trucks and buses generally use air under pressure as the operating medium. Typically, air actuators have a mechanical output which applies brake pads to the brake rotor via a lever or gear mechanism. The lever mechanism includes an operating shaft pivotable about two bearing surfaces on a common axis to urge one or more pistons against a brake pad via a cam surface. The shaft has a lever arm acted upon by the air actuator, and may include another generally shorter arm to actuate a wear adjuster mechanism. For larger brake pads, multiple pistons are provided to optimize pressure distribution on the brake pad backplate. A known braking mechanism of this type is shown in document WO2004/074705 (Knorr-Bremse). For lighter duty applications (e.g., lighter trucks or trailers of tractor—trailer units) with smaller brake pads a single piston is sufficient. An example of a brake of this type is EP0730107 (Perrot Bremsen).

In known heavy vehicle disc brakes (see FIG. 8) it is usual for the brake pads 111 to be fitted and removed from the disc brake 102 in a radial to the wheel center inward/outward direction via a radial opening in the brake caliper. This arrangement allows brake pad 111 replacement to occur without removal of the brake caliper. The brake pads 111 are held within the disc brake 102 by a pad retainer 192 that extends across the center of the brake pad 111 and leaf spring 193 that urges the pad in a radially inward direction. This is beneficial as calipers of heavy vehicle brakes are generally too heavy for them to be safely lifted and manipulated by one person, in contrast to disc brakes of light vehicles.

This approach to fitting and removal can be achieved with relatively little skill, but does not offer any particular functional benefits in terms of pad retention within the disc brake, fool proofing of fitting etc.

The present invention seeks to overcome or at least mitigate the problems of the prior art.

SUMMARY

A first aspect of the present invention provides a heavy vehicle disc brake, the disc brake comprising: first and second brake pads for selectively contacting opposing inboard and outboard faces of a brake rotor respectively; a brake caliper for confining the first and second brake pads in at least an inboard-outboard direction; an actuation mechanism housed within the brake caliper for selectively bringing the brake pads into contact with the rotor; and a first and a second brake pad support structures for restraining the first and second brake pads in a circumferential direction respectively; wherein at least one of the first and second brake pads and the corresponding first and second support structures comprise complementary profiles on circumferential faces thereof arranged so as to permit the brake pad to be inserted into the mounting structure in a transverse direction of the pad and at an angle to the circumferential direction of the structure and then for the brake pad to be pivoted about a fixed center of rotation when a circumferential surface of the brake pad is in contact with a complementary circumferential surface of the structure to be brought into a fitted position in the structure.

Advantageously this arrangement allows the brake pad to be fitted to the caliper in a manner that is less prone to jamming than the known radial way and may make fitting in the wrong orientation less likely or impossible due to there being more visual and mechanical clues of any such error. Further the arrangement may permit a smaller, simpler and lighter pad retainer to be used.

The complementary circumferential surface of the structure may define an undercut for receiving the brake pad.

At least one brake pad may comprise a first circumferential surface having a profile that defines a part circular segment of a first fixed radius for contact with a complementary first circumferential abutment surface.

Advantageously this may enable the pivoting action to occur smoothly, and also to provide a large bearing contact area under braking to transmit brake forces loads from the pad to the corresponding support structure.

At least one brake pad may comprise a second circumferential surface, the second circumferential surface may have a profile that may define a part circular segment of a second fixed radius, the second fixed radius being greater than the first fixed radius for contact with a complementary second circumferential abutment surface.

The second radius may substantially coincide with the center of the first radius.

Advantageously this allows for the second circumferential surface and second abutment surface to additionally have a large bearing contact area under braking to transmit brake force from the pad to the corresponding support structure.

The corresponding support structure may further comprise a radial abutment surface to support the brake pad in a radial direction proximate to the second circumferential abutment surface.

The first circumferential abutment surface may be arranged on a leading side of the disc brake with respect the usual direction of rotation of the rotor.

Advantageously, this orientation means the geometry of the brake pad and corresponding abutment surfaces ensure that in the forward direction of movement of a vehicle to which the disc brake is fitted the forces acting on the brake pad tend to hold the brake pad within the pad support arrangement without additional retention structures coming into use.

The disc brake may further comprise a releasable or removable pad retaining structure proximate a second circumferential abutment surface remote from the fixed center of rotation.

The retaining structure holds the brake pad in place on those occasions when the vehicle is being braked when maneuvering in its reverse direction.

Both the first and second brake pads and the corresponding first and second support structures may comprise complementary profiles on circumferential faces thereof so as to permit both brake pads to be inserted into the mounting structures in a circumferential direction of the pad and at an angle to the circumferential direction of the structure and then for both brakes pads to be pivoted about a fixed center of rotation when a circumferential surface of each brake pad is in contact with complementary circumferential surfaces of the complementary structures to be brought into fitted positions with the structures.

The first and second brake pads may be shaped such that when facing each other in a parallel relationship with friction material facing friction material, the brake pads have mirror symmetry about a plane parallel to friction faces of the brake.

Advantageously this provides that both brake pads may have similar wear characteristics in use.

The first circumferential abutment surface of both brake pads may be arranged on a leading side of the disc brake with respect to the usual direction of rotation of the rotor.

Advantageously this means that both the inboard and outboard pad geometry and corresponding abutment surfaces ensure that in the forward direction of movement of a vehicle to which the disc brake is fitted the forces acting on the brake pads tend to hold the brake pads within the pad support arrangement without additional retention structures coming into use.

At least one brake pad may comprise friction material mounted to a strengthening backplate e.g., of metallic material, and the friction material at the circumferential surfaces of the backplate may follow substantially the same profile as the backplate and stepped in from the circumferential surface by up to approximately 4 mm.

Advantageously this provides for efficient use of backplate material.

The friction material may follow substantially the same profile as the backplate around substantially the entire perimeter of the backplate and is stepped in from the circumferential surface of the backplate by up to approximately 4 mm.

Advantageously this provides for even more efficient use of backplate material.

A second aspect of the present invention provides a brake pad for fitment into a disc brake according to the first aspect of the present invention, the brake pad comprising a first circumferential face having a profile that defines a part circular segment having a first fixed radius and a second circumferential face having a second fixed radius, the second fixed radius being greater than the first fixed radius.

The center of the second radius may substantially coincide with the center of the first radius.

The first and second brake pads may be dimensioned such that when facing each other the brake pads have mirror symmetry in a parallel spaced relation with friction material facing material to friction faces of the brake pads and equidistant from both brake pads.

The first and second brake pads may alternatively be dimensioned differently such that at least one of the first and second pads cannot be mounted in a corresponding pad mounting structure of the other of the first and second brake pads.

This arrangement may provide a further foolproofing of pad fitting such that even if one of the pads can be wrongly fitted, the second pad in a replacement kit could not, thereby alerting the fitter to their error.

A third aspect of the present invention may provide a method of fitting a brake pad of the first aspect of the present invention to a disc brake of the first aspect of the present invention comprising the steps of: inserting the brake pad into the mounting structure in a transverse direction of the pad and at an angle to the circumferential direction of the structure and then pivoting the brake pad about a fixed center of rotation when a circumferential surface of the brake pad is in contact with a complementary circumferential surface of the structure to bring the brake pad into a fitted position in the structure.

A fourth aspect of the present invention relates to a backplate for a brake pad of a disc brake.

The backplate comprises a rear wall with an inner surface for supporting a friction material and an opposing, outer surface. When the backplate is mounted in the disc brake for use, the inner surface faces towards a brake rotor and the outer surface faces away from the rotor.

In an embodiment, the backplate may comprise a first side surface for contacting a first abutment of the disc brake when the backplate is mounted in the disc brake for use, and an opposing second side surface for contacting a second abutment of the disc brake when the backplate is mounted in the disc brake for use.

In an embodiment, the backplate may further comprise a third side surface for contacting a third abutment of the disc brake when the backplate is mounted in the disc brake for use, and an opposing fourth side surface for contacting a fourth abutment of the disc brake when the backplate is mounted in the disc brake for use.

In an embodiment, the backplate may further comprises at least one stiffening rib to provide a stiffening effect on the backplate. As a consequence, the thickness of the rear wall can be reduced without compromising the strength and integrity of the backplate.

Preferably, the at least one stiffening rib may be configured to strengthen the backplate with respect to forces acting on the backplate during operation. For example, the at least on stiffening rib may be configured to strengthen the backplate with respect to a retaining force, an applied clamping force, a drag braking force and/or an abutment force.

Preferably, the at least one stiffening rib may be configured so as to improve the noise behavior of the backplate during use.

During braking, a clamping force is applied to the backplate so as to move the brake pad towards the rotor. When the brake pad contacts the rotor, a drag braking force is generated due to the friction between the friction material and the rotor. The drag braking force acts on the disc brake in a tangential direction to the rotating rotor. Due to the rotational path of the rotor, the direction of the drag braking force changes across the rear wall and can be plotted as a vector pathway. The drag braking force may cause the backplate to move in a circumferential direction towards the first abutment or second abutment depending on the rotating direction of the rotor. However, the circumferential movement of the backplate is impeded by an abutment counteracting force. Depending on the eigen frequency of the backplate, the backplate may produce an audible squeal noise during use.

To optimize the strengthening of the rear wall and improve the force distribution across the backplate, the at least one stiffening rib may be an elongate rib configured to extend at least substantially across the rear wall between the first side surface and the second side surface.

The at least one stiffening rib may comprise a plurality of stiffening ribs wherein a first stiffening rib is configured to extend at least substantially across the rear wall between the first side surface and the second side surface of the backplate and a second stiffening rib is configured to extend at least substantially across the rear wall between the third side surface and the fourth side surface of the backplate.

To enhance the stiffening effect of the at least one rib with respect to the drag braking force acting on the backplate, the at least one stiffening rib may be an elongate rib configured to follow at least a portion of the vector pathway of the drag braking force acting across the rear wall. The vector pathway may follow a curved path across the rear wall and the elongate rib may be a curved elongate rib.

To improve the stiffening effect of the at least one rib with respect to the abutment force acting on the backplate and help minimize plastic deformation of the backplate by the abutments of the disc brake, the at least one stiffening rib may be a rib orientated on the rear wall to perpendicularly intersect the first and/or second side surface, or alternatively the third and/or fourth side surface.

If the brake pad is to be held within the disc brake by a pad retainer, the backplate preferably comprises an interface to form a mating contact with the pad retainer and the at least one stiffening rib may be configured to strengthen the rear wall with respect to a retaining force applied by the pad retainer. The at least one stiffening rib may be a localized rib arranged in a region of rear wall adjacent to the interface.

To optimize the stiffening effect of the at least one localized rib with respect to the retaining force acting on the backplate and help minimize plastic deformation of the backplate by the pad retainer, the at least one localized rib may be orientated to perpendicularly intersect the interface.

To improve the noise behavior of the backplate, the at least one stiffening rib may be configured so as to adapt the eigen frequency and thereby tune the backplate. By tuning the backplate, audible squeal noises are preferably minimized.

Preferably, the at least one stiffening rib is formed on the outer surface of the rear wall. The at least one rib may comprise a recess and/or ridge formed in the rear wall. The recess/ridge may have any suitable cross-sectional profile, including a circular profile, flat-bottomed/flat-topped profile or saw-tooth profile. The at least one stiffening rib may comprise a recess arranged in the outer surface or inner surface of the rear wall, the recess forming a corresponding ridge on the opposing inner surface or outer surface of the rear wall. The ridge or recess arranged on the inner surface of the rear wall may advantageously aid the attachment of the friction material and/or other functional component of the brake pad to the inner surface of the rear wall.

The first side surface of the backplate may be a first circumferential side surface for contacting a first circumferential abutment. The second side surface of the backplate may be a second circumferential side surface for contacting a second circumferential abutment. The first circumferential side surface and second circumferential side surface may be generally curved and/or generally linear. If both are generally curved, the first and second circumferential side surfaces may have generally the same radius of curvature or a different radius of curvature.

In an embodiment, the first side surface of the backplate is a first circumferential side edge portion of the rear wall and the second side surface of the backplate is a second, opposing circumferential side edge portion of the rear wall.

The third side surface of the backplate may be a first radial side surface for contacting a first radial abutment. The fourth side surface of the backplate may be a second radial side surface for contacting a second radial abutment. The first radial side surface and second radial side surface may be generally curved and/or generally linear. If both are generally curved, the first and second radial side surfaces may have generally the same radius of curvature or a different radius of curvature. The first and second radial surfaces may be separated by a link portion. The link portion may be arched so that the backplate can clear the rotating parts of the disc brake when mounted for use.

In an embodiment, the third side surface of the backplate is a first radial side edge portion of the rear wall and the fourth side surface of the backplate is a second, opposing radial side edge portion of the rear wall.

The first circumferential side edge portion and first radial flange side edge portion may be contiguous. Likewise, the second circumferential side edge portion and second radial side edge portion may be contiguous.

The backplate may comprise at least one stiffening flange extending from the inner surface side of the rear wall. Advantageously, the at least one flange provides an additional stiffening effect on the backplate and so the thickness of the backplate may be even further reduced whilst maintaining sufficient strength and integrity.

The rear wall and at least one stiffening flange are preferably integrally formed. The at least one stiffening flange may extend substantially perpendicularly from the rear wall.

The at least one stiffening flange may extend around a perimeter portion of the rear wall.

In an embodiment, the at least one stiffening flange comprises a first circumferential flange portion forming the first side surface of the backplate for abutting a first circumferential abutment and comprises a second, opposing circumferential flange portion forming the second side surface of the backplate for abutting a second circumferential abutment.

In an embodiment, where the backplate comprises a third side surface and fourth side surface, the at least one stiffening flange comprises a first radial flange portion forming the third side surface of the backplate for abutting a first radial abutment and comprises a second radial flange portion forming the fourth side surface of the backplate for abutting a second radial abutment.

The first circumferential flange portion and first radial flange portion may be contiguous. Likewise, the second circumferential flange portion and second radial flange portion may be contiguous.

In an alternative embodiment, the at least one stiffening flange is a peripheral flange substantially encircling the perimeter of the rear wall. The first side surface may be a first circumferential portion of the peripheral flange and the second side surface may be a second, opposing circumferential portion of the peripheral flange. The third side surface may be a first radial portion of the peripheral flange and the fourth side surface may be a second radial portion of the peripheral flange.

In addition to the stiffening effect, the at least one stiffening flange is also preferably configured to increase the contact area of the side surfaces of the backplate with the corresponding abutments, thereby enhancing the reaction of drag braking force from the backplate to the disc brake during braking.

Together, rear wall and at least one flange define a trough on the inner surface side of the rear wall. The trough defined by the rear wall and peripheral flange has a tub shape. The trough is preferably configured to accommodate at least one brake pad functional component between the friction material and rear wall of the backplate. The at least one functional component are configured in the trough so as to enhance the operation of the friction material. The trough may be configured to accommodate at least one functional component selected from a bonding to bond friction material to the inner surface of the rear wall (e.g., bonding glue or mechanical hooks), a thermal insulator to inhibit the transfer of heat from the friction material to the backplate and/or a noise dampener to absorb noise generated by the brake pad and/or alter the resonant frequency of the brake pad.

The trough may be configured to additionally accommodate a rear portion of friction material such that a front portion of friction material protrudes from the backplate.

The rear portion of the friction material may be wear limit portion of the friction material. An outer edge of the peripheral flange may define the wear limit of the friction material. In an alternative embodiment, an exposed section of the backplate may be configured to indicate the reach of the wear limit of the friction material, which may be detected by or based on a noise or sensor contact.

By forming the trough with the rear wall, the flange is able to provide additional mechanical contact between the friction material and the backplate, aid bonding, and reduce the risk of the friction material becoming separated from the backplate when subject to shear forces during braking.

Preferably the trough is substantially filled by the at least one functional component, and optionally the rear portion of the friction material. By substantially filling the trough, the stiffening of the flange is improved and risk of plastic deformation is reduced.

Preferably, the trough is substantially filled to reduce the ingress of water and/or foreign matter in the brake pad and minimize corrosion.

By recessing the at least one functional component (e.g., at least one of the bonding, the thermal insulator and/or the noise dampener), and optionally the rear portion of friction material, the backplate allows the thickness of sacrificial friction material for the brake pad to be optimized and the lifespan of the brake pad to be extended.

The stiffening effect of the at least one stiffening rib and/or at least one stiffening flange, allows for the thickness of the backplate material to be reduced whilst maintaining a backplate with sufficient strength and integrity to withstand the braking forces and travel forces acting on the vehicle in which the disc brake is fitted.

The stiffening effect of the at least one stiffening rib and/or at least one flange allows for the backplate to be formed from sheet metal material. The sheet metal material may have a relatively thin thickness of approximately 4 mm or less. The sheet metal material may have a thickness in the range of approximately 1 mm and 4 mm, preferably between approximately 2 mm and approximately 3 mm. The sheet metal material may be sheet steel. The trough may have a depth in the range of approximately 5 mm to 7 mm.

In an embodiment, the backplate comprises a press-formed body of sheet metal.

By using relatively thin sheet metal the overall mass of the backplate is minimized, which in turn leads to environmental and costs benefits. Also, the backplate may be press-formed from the sheet metal and cheap to manufacture.

A fifth aspect of the present invention relates to a brake pad comprising the backplate according to the fourth aspect of the invention.

In an embodiment, the backplate may be formed from sheet metal material having a thickness of approximately 4 mm or less; and comprises a rear wall having an inner surface for supporting friction material, and at least one flange extending from the inner surface side of the rear wall.

In an embodiment, the backplate comprises a rear wall having an inner surface to support a friction material and an opposing, outer surface; and at least one stiffening rib formed in the outer surface of the rear wall.

The brake pad may be an inboard brake pad or an outboard brake pad.

A sixth aspect of the present invention relates to a disc brake comprising a brake pad according to the fifth aspect of the invention.

A seventh aspect of the present invention relates to a method of press-forming a backplate from a blank of sheet metal material.

The method may comprise the step of cutting the blank of sheet metal material.

The method may further comprise step of pressing the blank to form at least one ridge and/or recess so as to define at least one stiffening rib.

The method may further or alternatively comprise the step of pressing to turn a border region of the blank at an angle from a central rear wall region to form at least one stiffening flange extending from the inner side of the rear wall.

BRIEF DESCRIPTION OF THE DRAWINGS

Embodiments of the present invention will now be described, by way of example only, with reference to the accompanying drawings, in which:

FIG. 6 is a cross-sectional view through the brake pad of FIGS. 4 and 5 on a plane 6-6;

FIG. 7 is an isometric view of a backplate of the brake pad of FIGS. 4 to 6;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
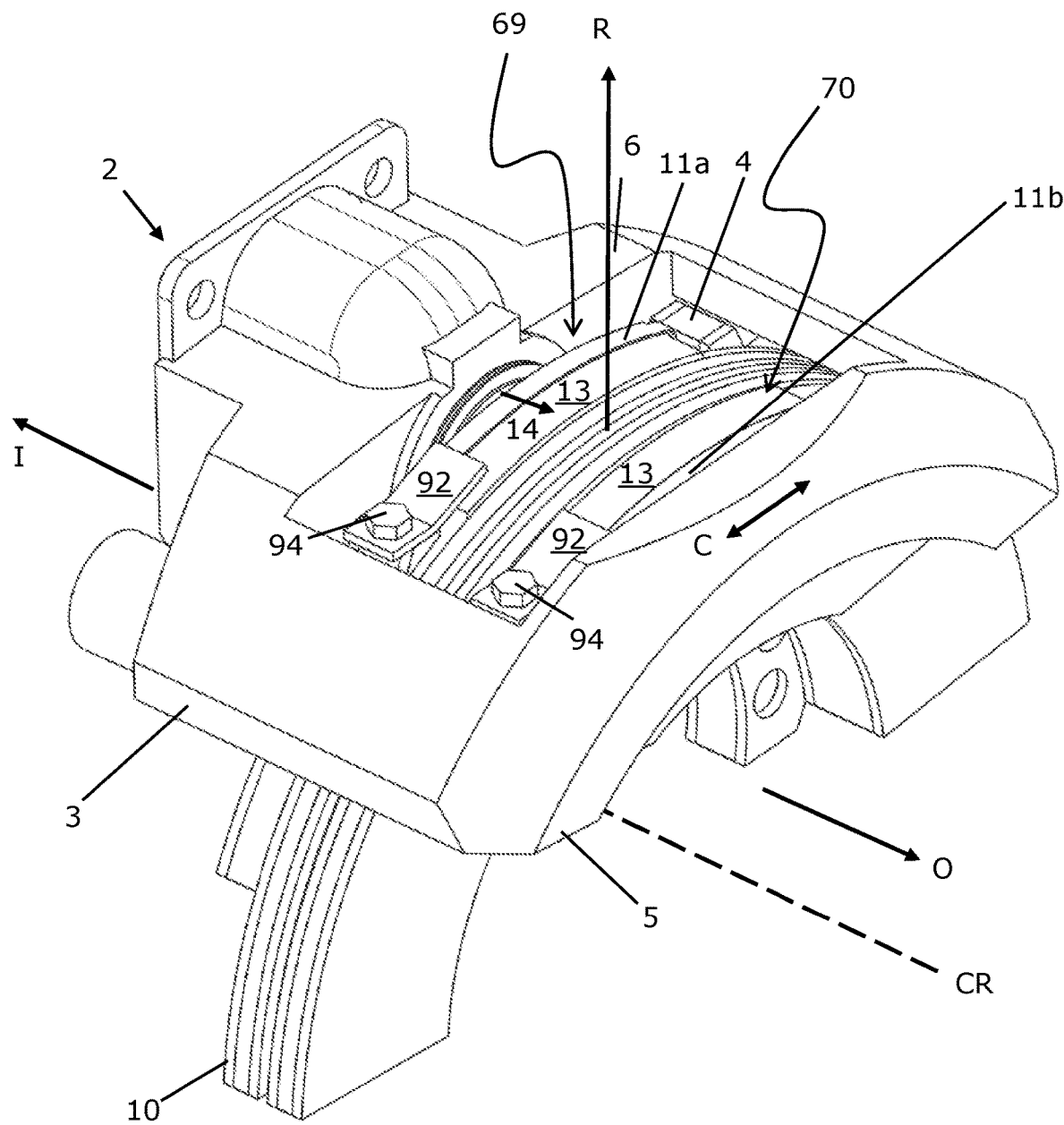
FIG. 1 is an isometric view of a disc brake, according to an embodiment of the present invention.

FIG. 1 illustrates a disc brake 2 of the present invention. The disc brake 2 incorporates an actuation mechanism (not visible) comprising a single piston and which is suitable for a commercial vehicle. This type of brake is particularly suitable for lighter duty heavy vehicles, for example smaller trucks, or a trailer of a tractor-trailer combination. In other embodiments the disc brake may be a twin piston brake—for example, a variant of the applicant's existing ELSA 2 family of disc brakes.

Various orientations of the disc brake are described. In particular, the directions inboard and outboard refer to the typical orientation of the disc brake when fitted to a vehicle and with reference to the longitudinal center line of the vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial (denoted by arrow R) describes an orientation with reference to the center of the wheel (rotor). Circumferential (denoted by arrow C), or also called tangential, describe orientations with respect to the brake rotor. Radial refers to a direction towards or away from the center of rotation of the brake rotor, whereas circumferential (C) describes a direction of rotation of the rotor about its center of rotation (denoted CR).

The disc brake 2 comprises a caliper 3 having a housing 6 to accommodate the actuation mechanism and which is slideably mounted on a carrier 4 for movement in an inboard-outboard direction.

The caliper 3 can slide on the carrier 4 in an inboard-outboard direction, by way of first and second guide pins (not shown) as is well known.

An inboard brake pad 11a comprises a layer of friction material 13 and is arranged so that the friction material 13 faces a brake rotor 10 (also known as a brake disc). The inboard brake pad 11a is mounted on the carrier via an inboard brake pad support structure 69. In this embodiment, the inboard brake pad support structure 69 is a window or recess in brake carrier, described in more detail below. The inboard brake pad 11a is moveable in the direction of arrow 14 against the brake rotor 10.

An outboard brake pad 11b, also with a layer of friction material 13, is also provided. The outboard brake pad 11b is mounted to an outboard brake pad support structure 70 as described in further detail below. Suitable components are provided to urge an outboard brake pad 11b against the opposite side of the rotor 10. In this embodiment, the caliper comprises a bridge 5 arranged so as to straddle the rotor 10 and to transmit the reaction force from an inboard operating shaft (not shown) of the actuating mechanism to the outboard pad 11b. In this embodiment the housing 6 and bridge 5 are manufactured as a single monolithic casting, but in other embodiments, the bridge may be bolted or otherwise secured to the housing.

In this embodiment, a spreader plate (not visible) is provided in the form of an enlarged outboard head of the piston. The main function of the spreader plate is to spread the load applied by the single piston across a greater proportion of the circumferential width of the inboard pad 11a, which is particularly useful for high pressure applications (e.g., an emergency stop), to more evenly distribute the load applied to the pads. There is also an effect on wear; i.e., wear closer to the center of the pad (where the piston is applied) can be reduced, to provide a more even distribution of wear.

Figure 2:
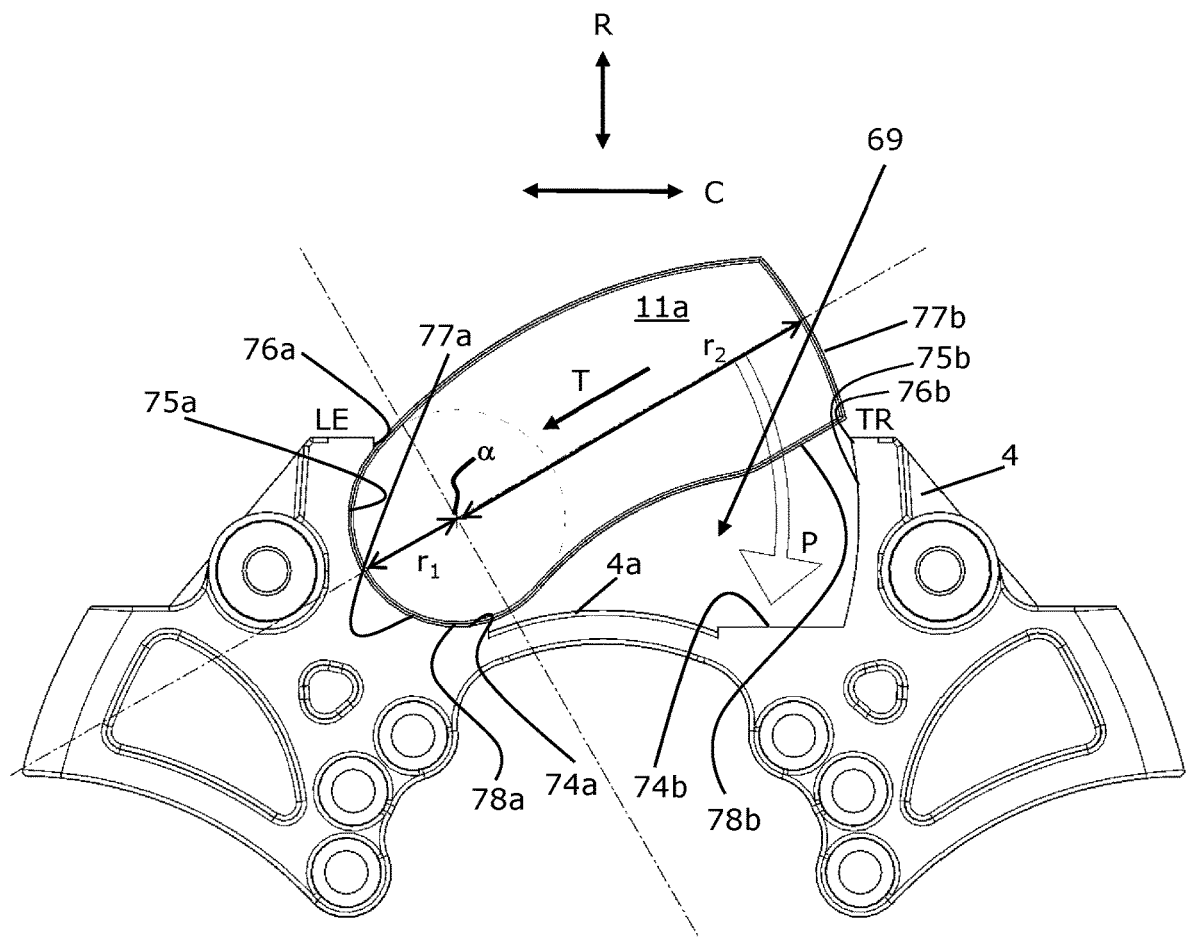
FIGS. 2 and 3 are side views of a brake pad and carrier of the disc brake of FIG. 1 in a part-fitted and fitted position respectively.

With reference to FIG. 2, the carrier 4 has radial pad abutment surfaces 74a, 74b to support the inboard pad 11a in a radial direction. The radial abutment surfaces 74a, 74b are located either side of an arched 'link' portion 4a of the carrier, the link portion 4a connecting the left and right sides of the carrier 4.

The carrier 4 further comprises first and second circumferential pad abutment surfaces 75a and 75b. The radial pad abutment surfaces 74a, 74b and circumferential pad abutment surfaces 75a and 75b are machined in this embodiment, but they could be forged, or just left as cast as desired.

The circumferential and radial pad abutment surfaces 74a, 74b, 75a and 75b define the inboard pad support structure 69 that is arranged to support the inboard pad 11a in a radially inward and circumferential (i.e., rotational) direction. As the brake is actuated, the abutment surfaces 74a, 74b, 75a and 75b react the torque that is created as the inboard pad 11a clamps the rotor 10. The abutment surfaces also act to locate the inboard brake pad 11a.

Figure 3:
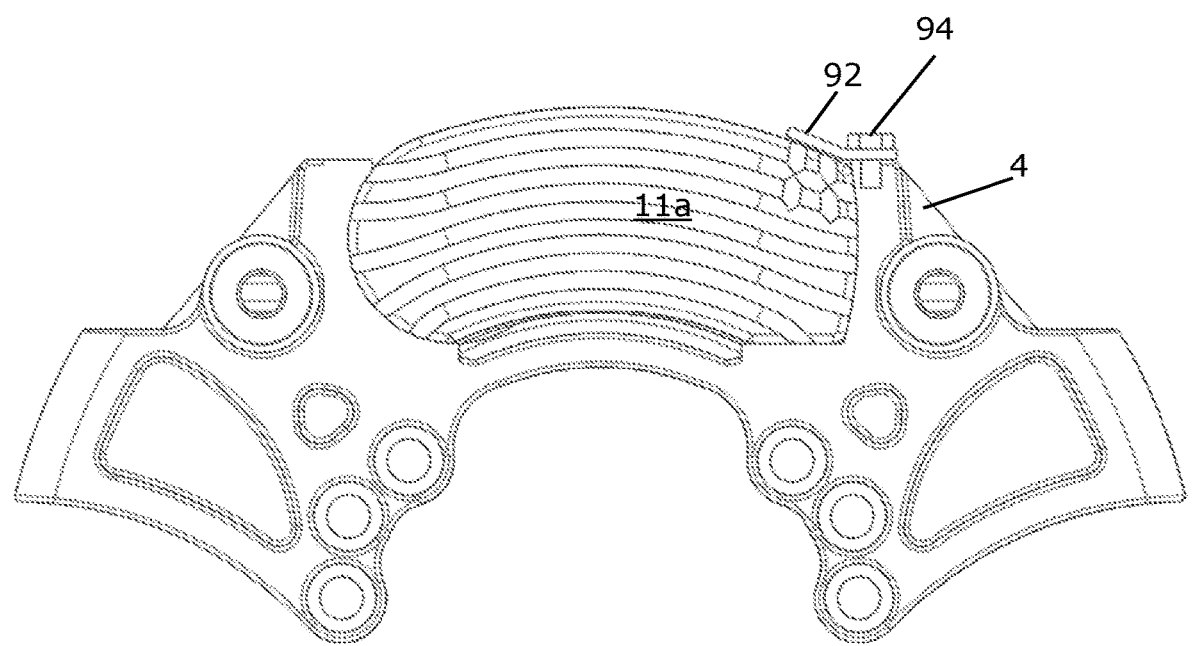

The inboard brake pad 11a and the corresponding inboard pad support structure 69 comprise complementary profiles on circumferential faces thereof arranged so as to permit the brake pad to be inserted into the mounting structure in a transverse direction T of the brake pad 11a and at an angle to the circumferential direction C of the structure until the pad abuts the first circumferential abutment surface 75a, and then for the brake pad to be pivoted in a direction P about a fixed center of rotation α when the first circumferential surface 77a of the brake pad is in contact with the first circumferential abutment surface 75a of the structure to be brought into a fitted position in the structure. The fitted position is shown in FIG. 3.

In this embodiment, the first circumferential surface 77a of the inboard brake pad 11a has a profile that defines a part circular segment of a first fixed radius r1 for contact with the complementary first circumferential abutment surface 75a. It will also be appreciated that in this embodiment a first radial surface 78a of the brake pad is partially contiguous with the first circumferential abutment surface 77a. In other words, because the surface is curved it transmits force with both a circumferential and radial component in some locations.

In addition, the first circumferential abutment surface 75a extends around the first circumferential surface of the inboard brake pad 11a such that a gap distance from the radially outermost tip 76a of the first circumferential abutment surface 75a to the corresponding tip 76b of the second circumferential abutment surface 75b is less than the greatest distance between corresponding points on the two circumferential abutment surfaces 75a, 75b radially inward of the tips. In other words, a portion of the first circumferential abutment surface 75a radially outward of the brake pad extends above a portion of the brake pad 11a at the first end thereof.

This means that in effect the brake pad is accommodated within a curved undercut defined by the first circumferential abutment surface 75a. This prevents the brake pad 11a being lifted from the inboard pad support structure 69 by it pivoting about the second end of the brake pad, rather than about the first end of the brake pad i.e., only fitting and removal in the way described below is possible when the disc brake 2 is assembled.

The second circumferential surface of the brake pad 77b has a profile that also defines a part circular segment of a second fixed radius r2. The second fixed radius is greater than the first fixed radius and is arranged to contact the complementary second circumferential abutment surface 75b, which is also part-circular with a similar radius.

In order that the brake pad 11a, when fitted, has a large bearing area in contact with the second circumferential abutment surface 75b for transmitting the brake force under braking, the center of the second radius r2 substantially coincides with the center a of the first radius r1.

In this embodiment, the second radial surface of the brake pad 78b has a generally planar profile and is arranged to contact the complementary second radial abutment surface 74b, which is also generally planar.

The second radial abutment surface 74b, in contrast to the first, is arranged with a defined angle at its intersection to the second circumferential abutment surface 75b, in order to support the brake pad in a radially inward direction at its second end. In some variants of the carrier (not shown) a stress-relief feature may separate the second radial and circumferential abutment surfaces 74b, 75b, however.

The first circumferential abutment surface 75a is arranged on a leading side (denoted LE) of the disc brake with respect the usual direction of rotation of the rotor 10 (clockwise in FIG. 2). The second circumferential abutment surface 75b is arranged on the trailing side (denoted TR). Thus, in the forward direction of movement of a vehicle to which the disc brake 2 is fitted, the forces acting on the brake pad 11a tend to hold the brake pad within the pad support structure without additional retention structures coming into use.

However, since vehicles typically also maneuver in a reverse direction (at low speed and for a small proportion of their operating time), the geometry set out above may require a structure to counteract the forces acting on the brake pad 11a when rotation of the rotor 10 is reversed. Thus, as is shown in FIG. 3, a pad retainer in the form of a plate 92 is provided, which extends from the second circumferential abutment 75b over part of the radially outer face of the brake pad 11a. A bolt 94 (or other appropriate fastening component) passes through the plate 92 and into a threaded bore in the carrier 4, to releasably secure the plate 92 in place.

In the disc brake 2 of FIG. 1 the outboard pad support structure 70 is arranged so as to have a similar geometry of radial and circumferential abutment surfaces 74a, 74b, 75a, 75b in order to receive and support an outboard brake pad 11b with similar or identical shape to the inboard brake pad 11a. In other embodiments, the outboard pad may have a different geometry and this may be advantageous in some circumstances, dependent upon functional requirements of the brake and/or whether some form of "poka-yoke" feature (foolproofing of fitting of pads in inboard and outboard locations) is to be provided.

Thus, a fitting operation of the outboard brake pad 11b is similar to that of the inboard brake pad 11a. However, whilst the inboard brake pad 11a is mounted on the carrier 4 of disc brake 2 via the inboard brake pad support structure 69 the outboard brake pad 11b is mounted to the bridge 5 of the caliper 3 by the outboard brake pad support structure 70. As such, the outboard brake pad 11b is supported radially and circumferentially by the caliper 3 when fitted in the outboard brake pad support structure 70. The equivalent radial and circumferential abutment surfaces of the outboard brake pad support structure 70 are provided in a face of the bridge 5 that is adjacent the rotor 10. However, as the position of the outboard pad 11b is fixed inboard-outboard with respect to the bridge 5, the abutment surfaces do not need to be as deep inboard-outboard as in the carrier 4, e.g., they may only be as deep as the corresponding circumferential and radial surfaces on the outboard brake pad 11b.

So as to maintain the benefit of the outboard brake pad 11b being inherently retained in the outboard pad support structure 70 in the normal rotational direction, in this embodiment, the inboard and outboard brake pads 11a, 11b are shaped such that when facing each other in a parallel relationship with friction material facing friction material, the brake pads have mirror symmetry about a plane parallel to friction faces of the brake pads and rotor 10. Thus, when fitted within the disc brake 2 as illustrated in FIG. 1, the pads have mirror symmetry about a plane normal to the center of rotation CR of the rotor 10 at the axial midpoint of the rotor.

This arrangement means that the pad retaining plate 92 for the outboard brake pad 11b is at the same trailing side of the pad as for the inboard brake pad, but is instead secured in a threaded bore on the bridge 5. A benefit of this pad shape is that it inherently provides a poka-yoke feature that prevents an individual pad being fitted in a reversed orientation within its corresponding support structure (i.e., with the backplate rather than friction material facing the rotor).

The friction material 13 of the brake pads 11a and 11b is mounted to a strengthening backplate 16 e.g., of metallic material. The friction material 13 at the circumferential surfaces of the backplate follows substantially the same profile as the backplate 16. However, for manufacturing reasons the friction material is stepped in from the entire perimeter surface by up to 4 mm. This arrangement optimizes the weight to friction material volume ratio of the brake pads, which is made possible by the simple pad retention arrangement in particular. The profile of the friction material and the backplate on the radially outermost and radially innermost edges (intermediate radial surfaces 78a, b) follows as closely as possible the contact area of the rotor so as to maximize the swept pad area.

Fitting of either brake pad 11a, 11b into the caliper is a simple matter of inserting the brake pad into the mounting structure in a transverse direction T of the pad and at an angle to the circumferential direction of the structure and then pivoting the brake pad about a fixed center of rotation when a circumferential surface of the brake pad is in contact with a complementary circumferential surface of the structure until the brake pad is brought into the fitted position in the structure in which the second radial surface 78b of the brake pad rests on the second radial pad abutment surface 74b. The pad retainer plate 92 may then be secured over the pad 11a, 11b by tightening down the bolt 94. Removal is achieved by the reverse procedure.

The construction of the backplate is now discussed in more detail in relation to FIGS. 2 to 7. The strengthening backplate 16 of the brake pads 11a, 11b must have sufficient strength and integrity to withstand the forces acting on brake pads during braking, and as the vehicle to which the disc brake is fitted travels, e.g., over uneven surfaces.

As shown in FIGS. 6 and 7, the strengthening backplate 16 comprises a rear wall 16a with an inner surface facing towards and for supporting the friction material 13 and an outer, opposing surface facing away from the friction material. When mounted for use, the inner surface faces the brake rotor 10 of the disc brake and the outer surface faces away from the rotor.

The strengthening backplate may comprise at least one stiffening flange extending from the inner surface side of the rear wall. The at least one stiffening flange may surround at least a perimeter portion of the rear wall. The stiffening effect of the flange helps to strengthen the backplate as well as increasing the area in contact with corresponding abutment surfaces of the disc brake 2.

In the embodiment depicted in FIGS. 3 to 7, the strengthening backplate comprises a stiffening peripheral flange 16b fully encircling the perimeter of the rear wall. The rear wall 16a defines a plane and the stiffening peripheral flange 16b extends substantially perpendicular from the inner surface side of the rear wall. First and second circumferential portions 167a, 167b of peripheral flange define the first and second circumferential surfaces 77a, 77b of the brake pad. First and second radial portions 168a, 168b of the peripheral flange define the first and second radial surfaces 78a, 78b of the brake pad.

The rear wall and at least one stiffening flange form a trough on the friction material side of the brake pad. In the embodiment depicted, the rear wall 16a and peripheral flange 16b define a trough 16c having a tub shape.

The trough is configured to accommodate at least one functional component of the brake pad. The functional component may be selected from a bonding to bond the friction material to the backplate, a thermal insulator to inhibit the transfer heat from the friction material into the backplate of the brake pad, and a noise dampener to absorb noise generated by the brake pad and/or to alter the resonant frequency of the brake pad. The bonding may comprise a steel mesh around which the friction material may be formed.

The trough may additionally accommodate a rear portion of friction material.

In the embodiment depicted in FIGS. 3 to 7, the friction material is attached to the inner surface of the rear wall 16a using a friction material bonding 17. As shown, a rear portion 13a of the friction material and layer of friction material bonding 17 is located in the trough 16c of the backplate, whilst a front portion 13b of the friction material protrudes from the backplate. The rear portion may be a wear limit portion of the friction material and the outer edge of the flange 16' may define a wear limit of the friction material.

The trough is substantially filled by the at least one functional component (e.g., a bonding, thermal insulator and/or noise dampener), and optionally the rear portion of the friction material. Substantially filling the trough enhances the stiffening of the at least one flange and reduces the risk of plastic deformation during operation. By substantially filling the trough, the friction material at the circumferential surfaces of the backplate follows substantially the same profile as the backplate 16. The friction material is stepped back from the outer perimeter of the backplate by the thickness of the at least one flange. The at least one flange provides additional mechanical contact between the friction material and the backplate, aids bonding and reduces the risk of the friction material becoming separated from the backplate during braking. Further, by filling the trough, the risk of water and other foreign matter entering a gap between the at least one flange and the friction material etc. and causing corrosion is minimized.

By recessing the at least one functional component (e.g., a bonding, thermal insulator and/or noise dampener), and optionally a rear portion of the friction material in the backplate, the thickness of sacrificial friction material in the brake pad that may be worn away in operation can be increased and the lifespan of the brake pad improved.

The backplate 16 may alternatively or additionally comprise at least one stiffening rib to help strengthen the backplate. The at least one stiffening rib is configured to help strengthen the backplate with respect to the forces acting on the brake pad during use. The forces may include, for example, a retaining force from a retainer, an applied load of the piston, an applied clamping force, a drag braking force induced between the friction material and rotor, and/or abutment forces from the abutment surfaces. The at least one stiffening rib may also be configured to change the eigenfrequency of the backplate and thereby help to reduce the generation of squeal noise during operation.

The at least one stiffening rib may comprise a recess and/or ridge arranged on the rear wall. The rib may comprise a recess formed in the rear wall 16a of the backplate, preferably on the outer surface of the rear wall. The recess may have any suitable cross-sectional profile including for example, a curved profile, flat-bottomed profile or saw-tooth profile. Preferably, a rib recess shaped on one surface of the rear wall forms a corresponding rib ridge on the opposing surface of the rear wall. For example, a rib recess formed on the outer surface of the rear wall forms a corresponding rib ridge on the inner surface of the rear wall. The ridge may aid the attachment of the insulator, noise dampener and/or friction material in the trough.

In the embodiment depicted in FIGS. 3 to 7, the backplate 16 comprises a plurality of elongate stiffening ribs 16d formed in the rear wall 16a to help strengthen the backplate. As shown in the FIGS. 4, 6 and 7, the ribs are elongate ridges 26 arranged on the inner face of the rear wall facing the friction material 13 and corresponding recesses 28 arranged on the outer face of the rear wall. The ridges 26/recesses 28 have a cross-sectional curved profile.

In this particular embodiment, the elongate stiffening ribs 16d are configured to help strengthen the backplate with respect to an applied load of the piston, an applied clamping force, a drag braking force induced between the friction material and rotor, and/or abutment forces from the abutment surfaces. The elongate stiffening ribs are also configured to tune the backplate and improve its noise behavior.

To improve the force distribution across the backplate the elongate stiffening ribs 16d extend across the full width of the rear wall 16a. To optimize the reaction of the brake pad to the drag brake force, the elongate stiffening ribs 16d are configured to follow the vector pathway of the tangential drag force acting across the rear wall. To counter abutting forces of the abutment surfaces acting on the brake pad, the elongate stiffening ribs 16d are configured to extend across the rear wall 16a between the first and second circumferential surface portions 167a, 167b of the peripheral flange and between the first and second radial surface portions 168a, 168b of the peripheral flange. To optimize the stiffening effect and help minimize plastic deformation of the backplate at the abutment interface, each stiffening rib is substantially perpendicular to the intersection between the rear wall and peripheral flange.

The backplate may further or alternatively comprise at least one stiffening rib formed in the rear wall that is configured to strengthen the backplate with respect to retaining forces applied by a brake pad retainer. The retaining forces generally act on a localized region of the backplate and so the at least one local stiffening rib is preferably arranged in the region of the rear wall adjacent to the brake pad retainer. To further strengthen the embodiment of the brake pad depicted in FIGS. 3 to 7 with respect to the retaining forces applied by the pad retainer plate 92, local stiffening ribs 16e are formed in a region of the rear wall adjacent the pad retainer. To optimize the stiffening effect and help minimize plastic deformation of the backplate by the pad retainer each stiffening rib is orientated to extend in a substantially perpendicular direction to the interface between the pad retainer plate 92 and rear wall.

The provision of the at least one flange and/or at least one stiffening rib allows for the thickness of the backplate material to be reduced whilst maintaining a backplate with sufficient strength and integrity to withstand the braking forces and travel forces acting on the vehicle in which the disc brake is fitted.

The enhanced stiffening effect of the at least one flange (e.g., peripheral flange 16b) and/or the at least one stiffening rib (e.g., stiffening ribs 16d, 16e) allows the backplate 16 to be formed from relatively thin sheet metal material.

The sheet metal material preferably has a thickness of approximately 4 mm or less. The trough may preferably have a depth of between approximately 5 mm to approximately 7 mm. Backplates 16 can be formed from a sheet metal, e.g., sheet steel, having a thickness of between approximately 1 mm to approximately 4 mm, preferably approximately 3 mm.

By using relatively thin sheet metal material the overall mass of the backplate is minimized, which in turn leads to environmental and costs benefits. Also, the backplate may be press-formed from the sheet metal material and cheap to manufacture.

In the embodiment depicted in FIGS. 3 to 7, the backplate 16 is press-formed from a sheet steel plate having a thickness of approximately 3 mm, whereby the rear wall and peripheral flange are integrally formed from the same sheet of material as a starting point and the trough has a depth of approximately 7 mm.

The backplate is preferably manufactured from a blank of sheet metal plate (normally coils of sheet metal plate) and press-formed between appropriate contoured dies in a press to form the at least one stiffening rib and/or at least one flange. The method of making the backplate comprises the initial step of cutting a blank from sheet metal. The method may further comprise the step(s) of pressing the blank to form ridges/recesses so as to define at least one stiffening ribs and/or drawing the blank in a press to turn the outer edges of the sheet metal to an angle approaching 90° so as to form the rear wall and at least one flange.

In other embodiments, the backplate can be cast, or formed using other suitable processes.

Figure 9:
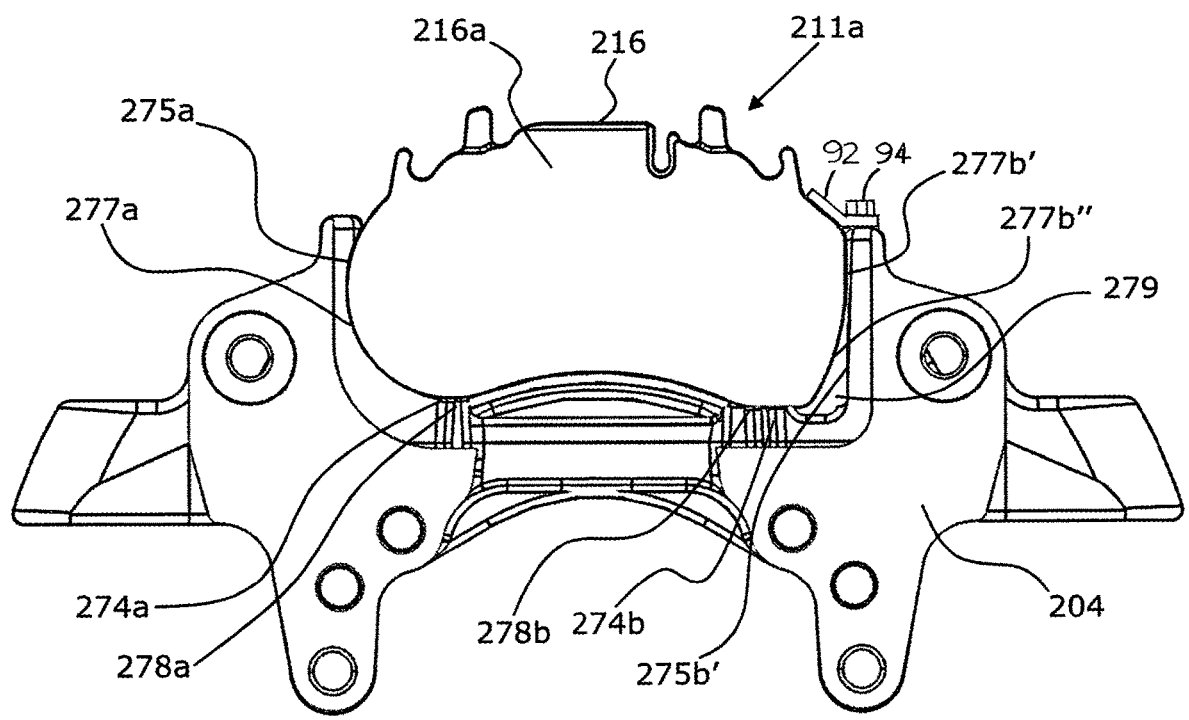
FIG. 9 is a front view showing the profile of an alternative backplate of a brake pad, the backplate being located in a brake carrier.
Figure 10:
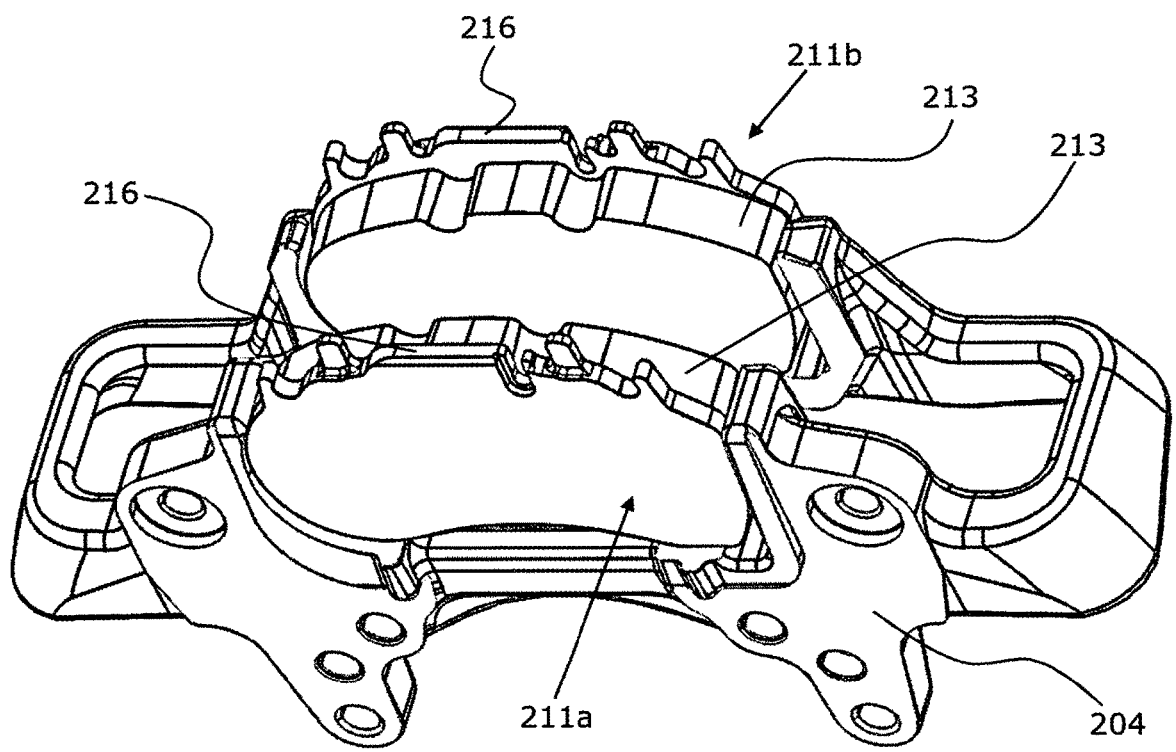
FIG. 10 is an isometric view of the arrangement of FIG. 9, showing inboard and outboard brake pads located in the brake carrier.
Figure 11:
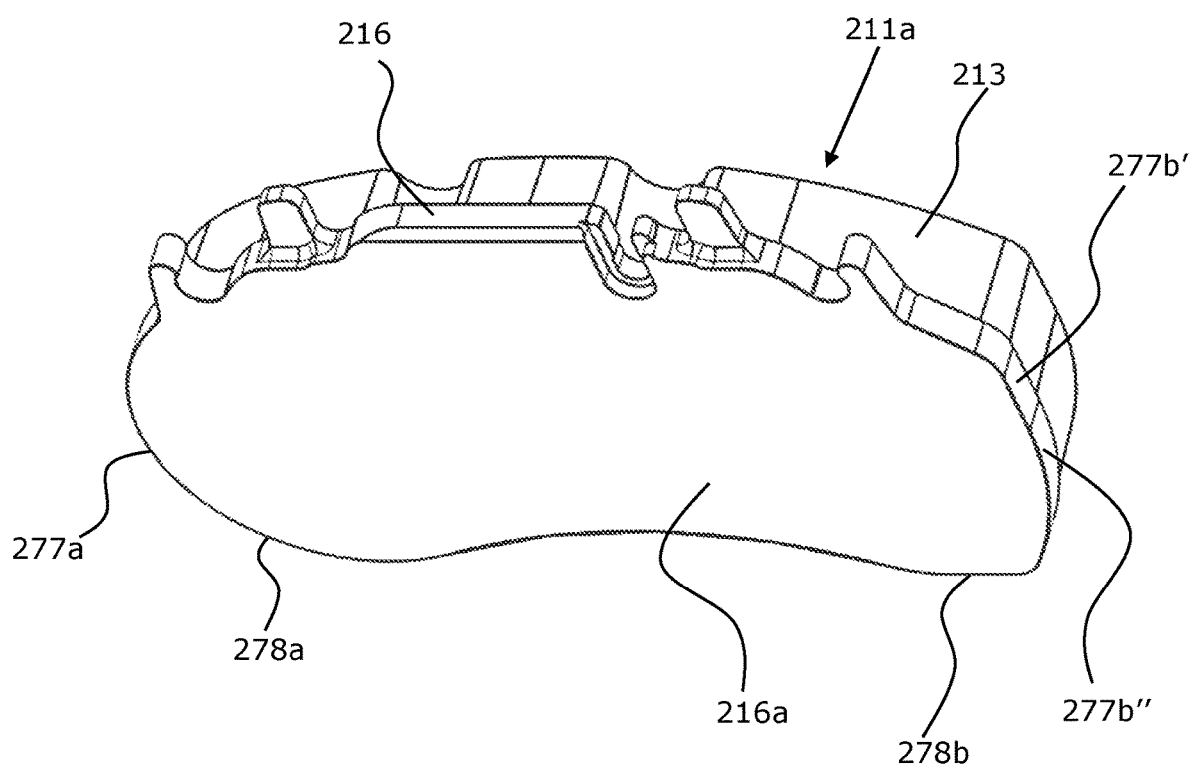
FIG. 11 is an isometric view of the inboard brake pad of FIG. 9, with the brake carrier and outboard brake pad omitted for clarity.

In a further embodiment shown in FIGS. 9 to 11, an alternative backplate profile for a brake pad 211a of a disc brake is shown. The general arrangement is similar to the backplate 16 of FIG. 2. A strengthening backplate 216 comprises a rear wall 216a with an inner surface facing towards and for supporting friction material 213 and an outer, opposing surface facing away from the friction material 213. When mounted for use, the inner surface faces the brake rotor (not shown, for clarity) of the disc brake and the outer surface faces away from the rotor.

The backplate 216 and a corresponding pad support structure (in this case a brake carrier 204, shown in FIGS. 9 and 10) both comprise complementary profiles on circumferential surfaces thereof, arranged so as to permit the brake pad 211a to be inserted into the mounting structure in the same way as the brake pad of FIG. 2.

In this embodiment, the first circumferential surface 277a and the first radial surface 278a of the backplate 216 have a similar profile to the first circumferential surface 77a and first radial surface 78a of the backplate 16 of FIG. 2. Like the backplate 16 of FIG. 2, the first radial surface 278a of the brake pad is partially contiguous with the first circumferential abutment surface 277a. In other words, because the surface is curved it transmits force with both a circumferential and radial component in some locations.

The brake pad 211a is accommodated within a curved undercut defined by a first circumferential abutment surface 275a of the brake carrier 204. This prevents the brake pad being lifted from the pad support structure by it pivoting about the second end of the brake pad, rather than about the first end of the brake pad i.e., only fitting and removal in the way described below is possible when the disc brake is assembled.

Fitting of the brake pad 211a into the carrier 204 is by the same method as the brake pad 11a shown in FIG. 2; the brake pad 211a is inserted into the carrier 204 in a transverse direction of the pad and at an angle to the circumferential direction of the structure and then pivoted about a fixed center of rotation when the first circumferential surface 277a of the brake pad 211a is in contact with the complementary first circumferential abutment surface 275a of the carrier 204, until the brake pad 211a is brought into the fitted position in the structure 204 in which the second radial surface 278b of the brake pad rests on a second radial pad abutment surface 274b.

The second circumferential surface of the brake pad 211a, however, has a profile that differs to the profile of the second circumferential surface 77b of FIG. 2. The second circumferential surface of the brake pad still generally defines a part circular segment of a second fixed radius, the second fixed radius being greater than the first fixed radius of the first circumferential surface 277a and being arranged to contact a complementary second circumferential abutment surface of the brake carrier, but, in contrast to the surface 77b of the backplate 16 of FIG. 4, the second circumferential surface does not have a constant curve. The circumferential surface is instead made up of a first portion 277b' and a second portion 277b" (shown most clearly in FIGS. 9 and 11). The second portion 277b" of the second circumferential surface is curved to define a part circular segment of the second fixed radius, similar to the second circumferential surface 77b of FIG. 2. However, the first portion 277b' of the second circumferential surface is not curved, but generally planar. As can be seen from FIGS. 9 and 11, the first portion 277b' extends in a generally radial direction, i.e., generally vertical. In this embodiment, a single corresponding planar circumferential abutment surface 275b' is provided on the carrier 204. The circumferential abutment surface 275b' also extends in a radial (i.e., vertical) direction and is arranged to engage the first portion 277b' of the circumferential surface. This 'flattened region' of the backplate 216 and brake carrier 204 enables a greater contact area and therefore better load transfer from the brake pad 211a to the carrier 204 under braking, at the circumferential side of the carrier 204 that engages the trailing edge of the brake pad 211a, which is subject to the most force during a braking operation. This better load transfer enables the thickness of the backplate 216 to be reduced, lowering manufacturing costs as well as enabling a lighter brake to be produced.

In this embodiment, the second radial surface 278b of the brake pad 211a has a generally planar profile and is arranged to contact a complementary second radial abutment surface 274b of the carrier 204, which is also generally planar.

The second radial surface 278b is arranged with a defined angle at its intersection to the second portion 277b" of the circumferential surface. There is a fillet transition from the circumferential abutment surface 275b' to the radial abutment surface 274b on the carrier 204, which acts as a stress-relief feature. The second circumferential surface 277b" does not engage the carrier abutment surface 275b' at all. Instead, the fillet transition is slightly recessed in the radial direction from the radial abutment surface 274b, to define a relief region 279, which aids assembly of the brake.

Figure 4:
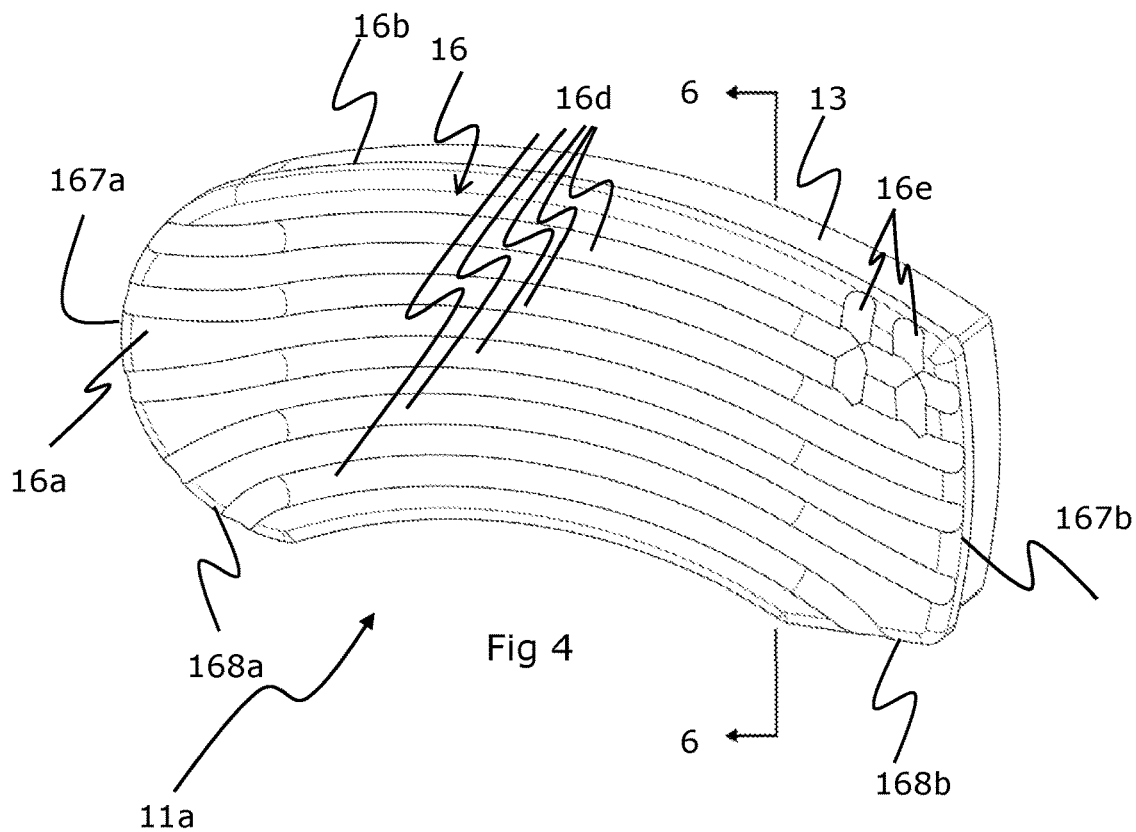
FIGS. 4 and 5 are isometric views of a brake pad of the disc brake of FIG. 1 from opposing directions.
Figure 5:
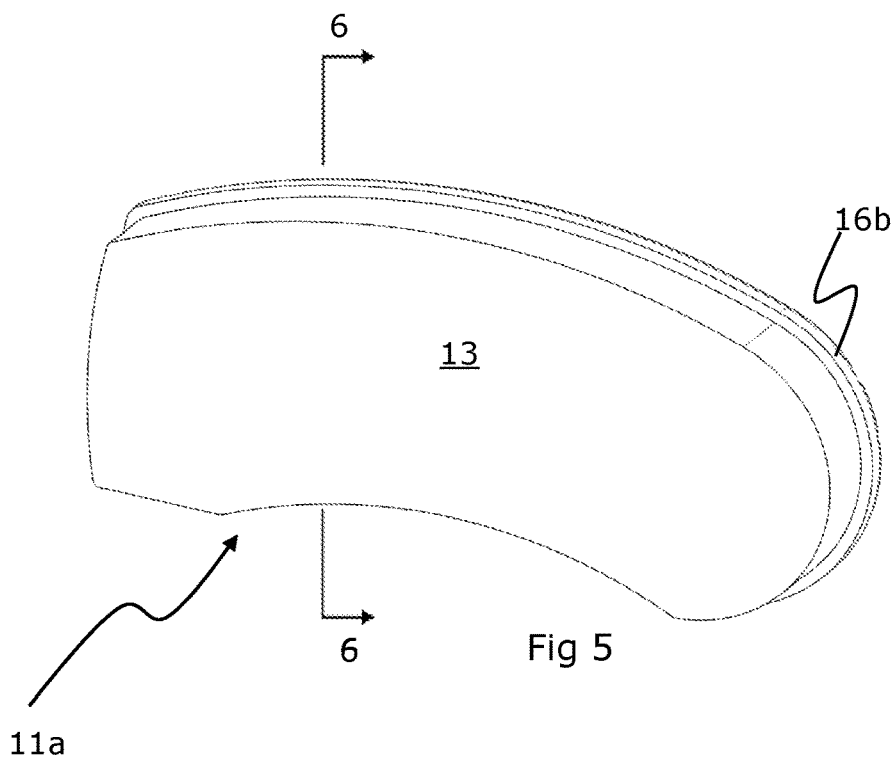

Although not shown in FIGS. 9 and 10, the backplate 216 may comprise a stiffening peripheral flange and stiffening ribs, like the backplate 16, as shown in FIG. 4. Also, the above has been described with reference to the inboard pad 211a, but can also apply to the outboard pad 211b, as shown in the embodiment of FIG. 10.

Figure 8:
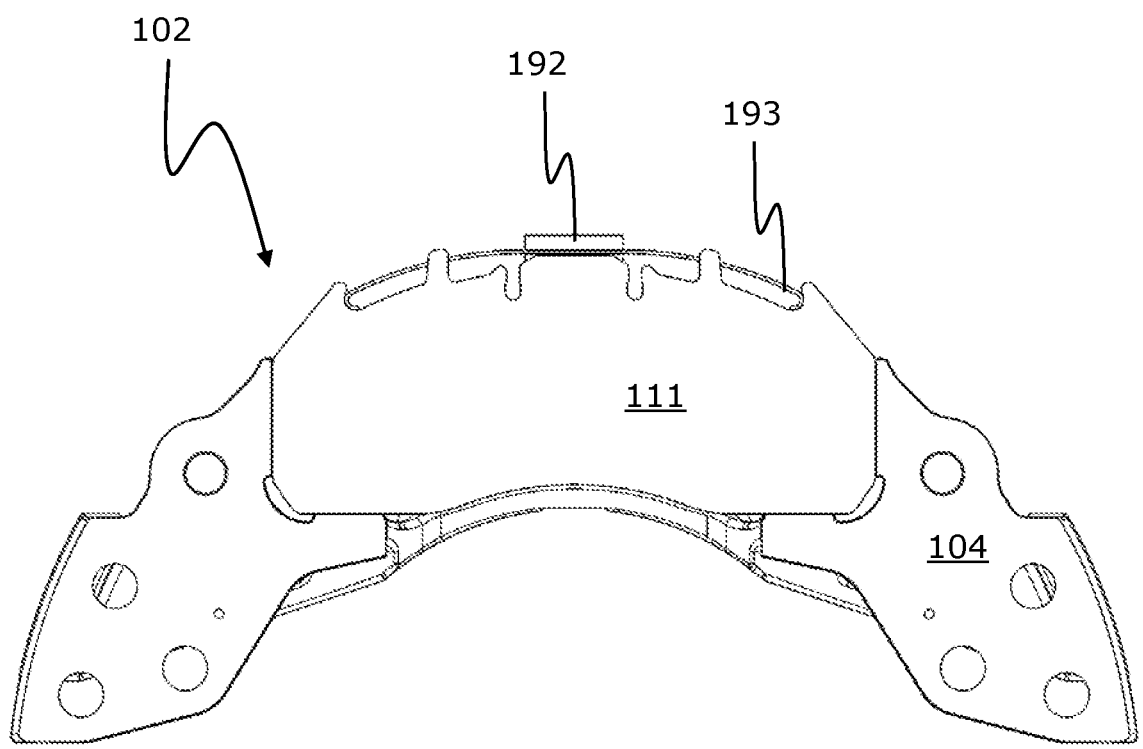
FIG. 8 is a side view of a known brake pad and carrier.

In this embodiment, the inboard and outboard brake pads 211a, 211b are retained within the brake with a conventional pad spring and pad retainer arrangement (not shown), as described above in the description relating to the prior art arrangements shown in FIG. 8. A pad spring is located on formations that project in a radially outer direction from the radially outer surface of each brake pad 211a, 211b, and urges the brake pads 211a, 211b in a radially inward direction. A pad retainer (also known as a pad strap) extends in an axial direction across the center of the brake and engages the inboard and outboard pad springs to retain the brake pads 211a, 211b within the brake.

Alternatively, however, the retaining arrangement could be similar to the arrangement described above in relation to FIG. 3, where a pad retainer in the form of a plate is provided, which extends from the second circumferential abutment 275b' over part of the radially outer face of the brake pad 211a. A bolt (or other appropriate fastening component) passes through the plate and into a threaded bore in the carrier 204, to releasably secure the plate in place.

It will be appreciated that numerous changes may be made within the scope of the present invention. For example, it will be appreciated that the circumferential surfaces may not be provided as an uninterrupted arc of a single radius, but may instead be two or more arcs connected by flats or alternative shapes. The brake pads may be manufactured in a more conventional manner, e.g., utilizing a cast backplate or a stamped backplate. In some embodiments, rather than a curve, the circumferential pad surfaces may comprise a series of flats with angled relative to each other in order approximate to a curve. Such an arrangement would still permit the pad to be pivoted about a fixed center of rotation, provided the corresponding pad abutment surface is itself part-circular.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake comprising:
   a first brake pad for selectively contacting a face of a brake rotor;
   a brake caliper for confining the first brake pad in at least an inboard-outboard direction;
   an actuation mechanism housed within the brake caliper for selectively bringing the first brake pad into contact with the brake rotor; and
   a first brake pad support structure for restraining the first brake pad in a circumferential direction;
   wherein the first brake pad and the first brake pad support structure have complementary profiles on circumferential faces thereof arranged to permit the first brake pad to be inserted into the first brake pad support structure in a transverse direction of the first brake pad and at an angle to the circumferential direction of the first brake pad support structure, and then for the first brake pad to be pivoted about a fixed center of rotation to a fitted position in the first brake pad support structure when a first circumferential surface of the first brake pad is in contact with a complimentary first circumferential surface of the first brake pad support structure, wherein the first circumferential surface of the first brake pad has a profile that defines a part circular segment of a first fixed radius for contact with a first circumferential abutment surface of the first brake pad support structure;
   wherein the first brake pad has a second circumferential surface that has a first portion and a second portion, the first portion is substantially planar and extends in a generally radial direction with respect to a central axis of the brake rotor, the first portion is in contact with a substantially planar portion of a second circumferential surface of the first brake pad support structure, wherein the second circumferential surface of the first brake pad has a profile that at least partially defines a part circular segment of a second fixed radius, the second fixed radius being greater than the first fixed radius, and a center of the second fixed radius substantially coincides with a center of the first fixed radius, and the substantially planar portion of the second circumferential surface of the first brake pad support structure extends in the generally radial direction with respect to the central axis of the brake rotor.

2. The disc brake of claim 1 wherein the first brake pad support structure further comprises a radial abutment surface to support the first brake pad in a radial direction proximate to a second circumferential abutment surface of the first brake pad support structure.

3. The disc brake of claim 1 wherein the first circumferential abutment surface is arranged on a leading side of the disc brake with respect to a usual direction of rotation of the brake rotor.

4. The disc brake of claim 1 wherein the disc brake further comprises a releasable or removable pad retaining structure proximate the second circumferential abutment surface remote from the fixed center of rotation.

5. The disc brake of claim 1 further comprising a second brake pad disposed on an opposite side of the brake rotor from the first brake pad and a second brake pad support structure for restraining the second brake pad in a circumferential direction of the second brake pad support structure, wherein the second brake pad and the second brake pad support structure have complimentary profiles on circumferential faces thereof arranged to permit the second brake pad to be inserted into the second brake pad support structure in the circumferential direction of the second brake pad support structure and at an angle to the circumferential direction of the second brake pad support structure, and then for the second brake pad to be pivoted about a second fixed center of rotation to a fitted position in the second brake pad support structure when a third circumferential surface of the second brake pad is in contact with a complimentary third circumferential surface of the second brake pad support structure.

6. The disc brake of claim 5 wherein the first and second brake pads are shaped such that when facing each other in a parallel relationship with a first friction material of the first brake pad facing a second friction material of the second brake pad, the first and second brake pads have mirror symmetry about a plane parallel to friction faces of the first and second brake pads.

7. The disc brake of claim 5 wherein the second brake pad support structure has a first circumferential abutment surface that is arranged on a leading side of the disc brake with respect to a usual direction of rotation of the brake rotor.

8. The disc brake of claim 5 wherein the first brake pad includes a first friction material mounted to a first backplate, wherein the first friction material at a circumferential surface of the first backplate follows substantially the same profile as the first backplate and is stepped in from the circumferential surface by up to 4 mm.

9. The disc brake of claim 8 wherein the second brake pad includes a second friction material mounted to a second backplate, wherein the second friction material follows substantially the same profile as the second backplate around substantially an entire perimeter of the second backplate and is stepped in from the circumferential surface of the second backplate by up to 4 mm.

10. The disc brake of claim 5 wherein the first and second brake pads are dimensioned such that when facing each other the first and second brake pads have mirror symmetry in a parallel spaced relation with a first friction material of the first brake pad facing a second friction material of the second brake pad about a plane parallel to friction faces of the first and second brake pads and equidistant from the first and second brake pads.

11. The disc brake of claim 10 wherein the first and second brake pads are dimensioned differently such that the first brake pad cannot be mounted in the second brake pad support structure and/or the second brake pad cannot be mounted in the first brake pad support structure.

12. A method of fitting a brake pad to a disc brake comprising the steps of:
 a. providing a brake pad support structure that has a first circumferential surface and a second circumferential surface that has a substantially planar portion;
 b. inserting the brake pad into the brake pad support structure in a transverse direction of the brake pad and at an angle to a circumferential direction of the brake pad support structure; and then
 c. pivoting the brake pad about a fixed center of rotation when a circumferential surface of the brake pad is in contact with a complementary circumferential surface of the brake pad support structure to bring the brake pad into a fitted position in the brake pad support structure, wherein the brake pad has a first circumferential surface and a second circumferential surface, wherein the first circumferential surface of the brake pad has a profile that defines a part circular segment of a first fixed radius for contact with a first circumferential abutment surface of the first brake pad support structure, the second circumferential surface of the brake pad has a profile that at least partially defines a part circular segment of a second fixed radius, the second fixed radius being greater than the first fixed radius, and a center of the second fixed radius substantially coincides with a center of the first fixed radius, and the second circumferential surface of the brake pad having a first portion and a second portion, wherein the first portion is substantially planar, extends in a generally radial direction with respect to a central axis of a brake rotor, and contacts the substantially planar portion.

13. A brake pad comprising:
 a first circumferential face having a profile that defines a part circular segment of a first fixed radius; and
 a second circumferential face that includes a profile that defines a part circular segment of a second fixed radius that is greater than the first fixed radius, a first portion, a second portion, and a transition point between the first and second portions, wherein the first portion is substantially planar and is disposed opposite the first circumferential face, the second portion is disposed opposite the first circumferential face, is recessed from the first portion, and is disposed closer to a bottom side of the brake pad than the first portion, and the transition point is disposed closer to the bottom side of the brake pad than a center of the first fixed radius is disposed to the bottom side, wherein a center of the second fixed radius substantially coincides with the center of the first fixed radius.

14. The disc brake of claim 1 wherein a transition point is provided between the first portion and the second portion, the second portion is recessed in the generally radial direction and is disposed closer to a bottom side of the first brake pad than the first portion, and the transition point is disposed closer to the bottom side of the first brake pad than the center of the first fixed radius is disposed to the bottom side.

15. The disc brake of claim 1 wherein the first brake pad support structure has a single second circumferential surface and the second circumferential surface is planar and extends in the generally radial direction with respect to the central axis of the brake rotor.

16. The disc brake of claim 1 wherein the first brake pad has an outer radial surface, and the first portion of the second circumferential surface extends from the second portion of the second circumferential surface to the outer radial surface.

17. The disc brake of claim 1 wherein the first portion of the second circumferential surface defines more than 30% of the second circumferential surface, and the second portion of the second circumferential surface defines more than 30% of the second circumferential surface.

* * * * *